Dec. 15, 1953 W. P. WILSON 2,662,642
SCREW DEWATERING CLASSIFIERS
Filed March 20, 1950 2 Sheets-Sheet 2
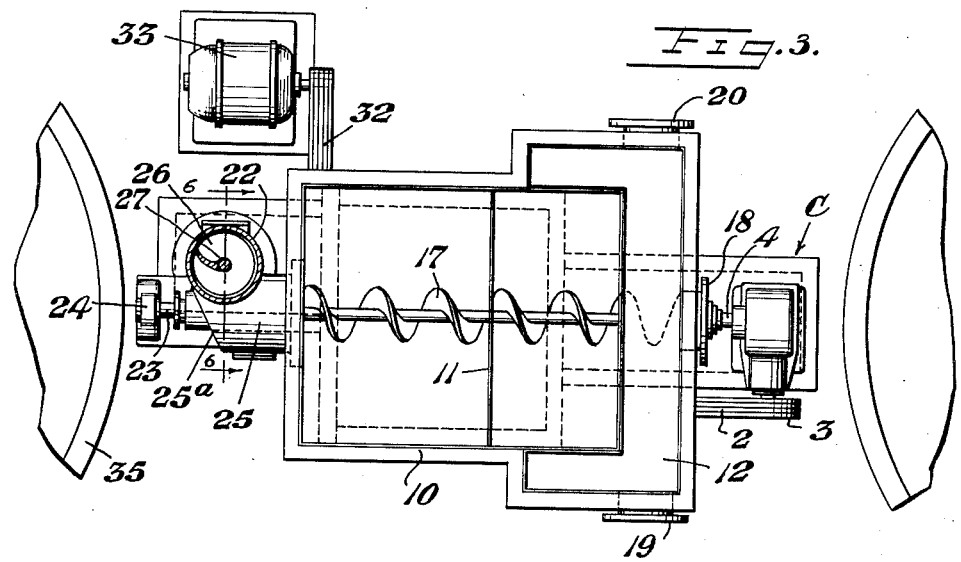
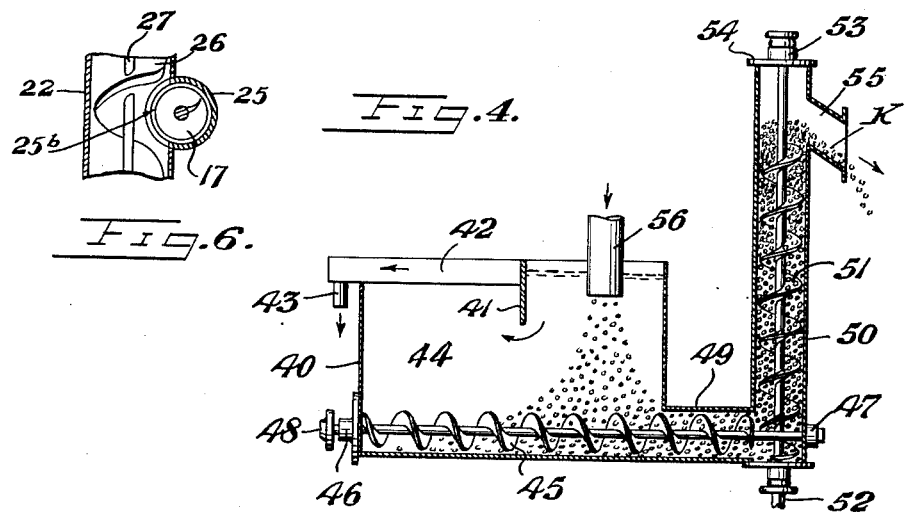
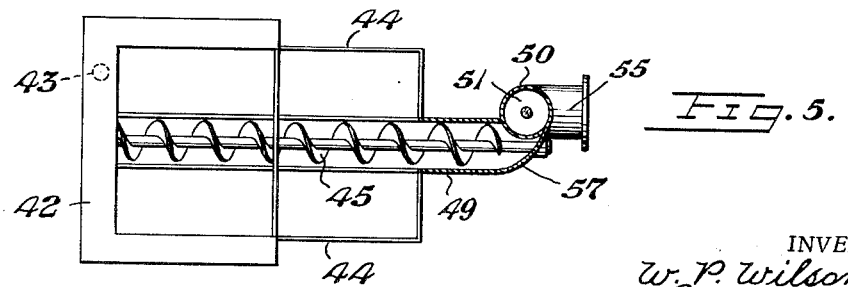
INVENTOR.
W. P. Wilson
BY
ATTORNEY

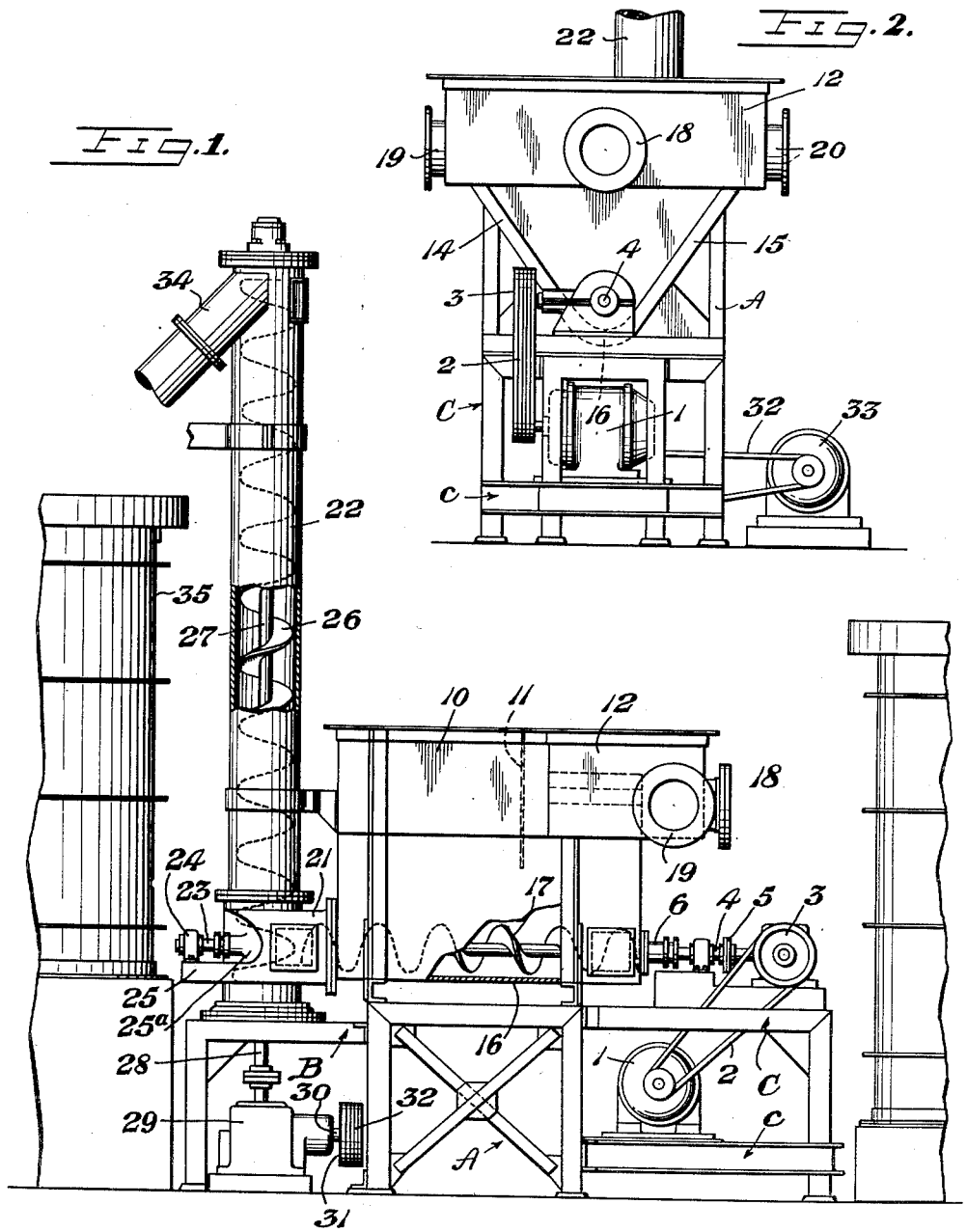

Patented Dec. 15, 1953

2,662,642

UNITED STATES PATENT OFFICE 2,662,642

SCREW DEWATERING CLASSIFIER

William P. Wilson, Carlsbad, N. Mex., assignor to United States Potash Company, New York, N. Y.

Application March 20, 1950, Serial No. 150,568

2 Claims. (Cl. 210—55)

This invention relates to improvements in an apparatus to be installed in classifiers in dissolving plants and comprehends a structure in the nature of a debrining screw for separating solution liquor from undissolved residue of ore, or salt from brine, by a continuous operation.

Heretofore attempts have been made to perform the desired operation by the use of steep sloping screw conveyors arranged on the side of a cone bottomed settling tank. In such installations the wet ore in the brine tends to bridge over the entrance to the screw conveyor and manual labor was required on the part of the operator to maintain a flow by disrupting the bridged ore so that it would feed into the conveyor. In the prior art it has also been conventional to use the standard rake and screw type classifier to separate solids from liquids, however, in such installations there is a limitation of a 20° inclination which inherently requires extremely large equipment to accomplish a job which is practical with the use of screws in a settling box. In installations of the open box screw conveyor type there is a limitation of 45° of its cross sectional area as a carrying medium, as a greater load will spill over the blade, and in such installations a five foot diameter spiral screw is required to carry the load of a one foot closed spiral conveyor, provided the latter is of a vertical elevator type where the whole surface of the screw is carrying the load. Generally the same difficulty is true of the rake type heretofore mentioned and in which the rakes lift out of the load, move back, dip into the load to push it up an incline in which the incline must be less than 20° for efficient operation. In such installations as heretofore mentioned dewatering efficiency is inherently sacrificed, as in both the drag and rake types the solid is necessarily spread to a layer of a few inches to allow drainage of the liquid. Necessarily both the rake and spiral type classifiers are extremely bulky and are considerably more expensive in installation, as well as covering a great deal of floor space.

In the instant invention the design, while not representing what might be generally considered a radical departure to one unskilled in the art, nevertheless the changes made in the present development over the prior structures permits a continuous operation, prevents bridging of the ore, and produces a dewatered product far superior to that produced by other methods and apparatus.

In the present apparatus, applicant has discovered that by use of a rectangular settling tank provided with relatively steep sides, a horizontal screw can be arranged in the bottom of the tank and this horizontal screw associated with a vertical lift screw, he is able to debrine the ore smoothly and continuously without any bridging difficulties which have heretofore been encountered. This is particularly true in connection with potash ores and in connection with which the prior structures have been extremely inefficient and bulky in assembly and use.

Applicant is not claiming the use of a horizontal screw conveyor associated with a vertical screw conveyor for handling cereal, cotton seed, and other pulverized or small lump solids as such arrangements of screws are well known in the art, but have never been adapted, nor has the novelty and new and unexpected results of this arrangement of parts been comprehended in the dewatering of ores and particularly potash ores and as a result of which substantially increased production is possible with less equipment and the use of a minimum amount of floor space.

It is therefore the object of this invention to provide an apparatus including a settling tank or chamber having relatively steep sloping sides and in the bottom of which is arranged a horizontal screw, the latter being associated with a vertical screw whereby the tank provides for the decanting of the liquor, the horizontal screw at the bottom of the tank conveys the solids to the vertical screw conveyor, tending to compact the solids during conveyance, and the vertical screw elevator completes the dewatering operation and compacting of the solids and eliminates liquid pockets, the vertical screw above the level of the fluid in the settling chamber further providing for a maximum dewatering of the solids until they are discharged in a dewatered condition substantially equivalent to free draining.

Another object of the invention is to provide an assembly in which the horizontal and vertical screws are associated to eliminate bridging of the ore without the use of manual labor.

A still further object of the invention is to provide an apparatus for accomplishing the results specified and in which the apparatus is relatively compact and is so designed as to use a minimum of floor space and expense, while at the same time producing maximum results.

Other objects of this invention will more clearly hereinafter appear by reference to the accompanying drawings, wherein like characters of reference designate corresponding parts throughout the several views, in which:

Fig. 1 is a side elevation of a dewatering apparatus having parts broken away in section;

Fig. 2 is an end elevation;

Fig. 3 is a top plan view;

Fig. 4 is a longitudinal section through a slightly modified form of apparatus;

Fig. 5 is a top plan view of the apparatus of Fig. 4; and

Fig. 6 is a section taken on line 6—6 of Fig. 3.

In the disclosure of Figs. 1, 2 and 3 a supporting structure is provided having a medial portion A for supporting the settling tank and end portion B for supporting the vertical screw and an opposite end extension C supporting the power plant and drive mechanism, the extension C having the sub-support c upon which a motor 1 is positioned which drives through a multiple V-belt 2 the pulley 3 and through the pulley 3 the shaft 4, the latter being provided with suitable coupling 5 and packing gland 6. The settling chamber or box is indicated generally by reference character 10 and medially of the upper part of this chamber, which is of general rectangular form, is the baffle 11 for aiding the settling operation, and a weir 12 being indicated generally by reference character 12 is provided for the removal of liquid overflow.

As shown more clearly in Fig. 2 the side walls 14 and 15 of the settling chamber are relatively steep yet terminate in a rounded bottom portion 16 in which is positioned the horizontal screw 17, the latter being driven by the shaft 4 through the source of power 1, indicated as an electric motor. To complete the assembly an inlet is shown at 18 with the lateral discharges 19 and 20, although this specific arrangement for the admission of the mixture and the overflow of the fluid can be modified as will be evidenced by an examination of the slightly modified form to be hereinafter described. The rounded bottom of the settling chamber indicated by the reference character 16 is of a cross-sectional form and dimension to snugly fit and accommodate the horizontal screw 17, this screw extending the full length of the tank and into the entrance chamber 21 of the vertical screw column 22. A shaft 23 for the outer end of the screw 17 is provided, this shaft being supported in the bearing bracket 24 which latter is supported by the casting 25 forming the inlet housing for the vertical screw.

The vertical screw column 22 is arranged, as best shown in Fig. 3, laterally of the horizontal screw 17 and the solid ore or salt is deflected laterally by the inclined end portion 25ª forming a deflector plate for the inlet housing 25 for directing the material through the side opening 25ᵇ and into the spiral of the vertical screw conveyor 26. The vertical screw conveyor 26 is mounted on the vertical shaft 27, the latter extending through the bottom of the column or tubular casing 22 and being rotated by means of a shaft 28 having bottom bearing supports shown generally at 29 and driven from the horizontal shaft 30 through pulley 31, the latter being powered by the multiple V-belts 32 from the motor or other suitable source of power 33, shown more clearly in Figs. 2 and 3. The upper end of the vertical screw column 22 discharges into the spout 34 to a suitable installation such as a turbo-mixer indicated at 35.

In the disclosure of Figs. 4 and 5 the arrangement is more diagrammatic. In fact, both illustrations are intended to be shown in their simplest form and in this second illustration the settling tank or chamber is indicated by reference character 40 and is of general rectangular form. A baffle 41 is provided transversely and medially of the settling tank 40 with an overflow launder 42 discharging into the overflow pipe 43. The longitudinal side walls of the tank indicated at 44 are inclined inwardly and downwardly at a substantial angle to converge in the arcuate well at the base, this well receiving the horizontal screw 45 which is mounted on bearings 46 and 47 at each end of the tank 40 and driven from any source of power through the coupling 48. The horizontal screw extends into the annular outlet extremity 49 which projects from one end of the tank and which is connected with the vertical screw chamber 50 in which the vertical screw 51 is arranged, the latter being driven from a motor or other source of power through a shaft extension 52 which may be connected by any suitable means with suitable power. The upper end of the vertical shaft which carries the screw 51 is mounted in the upper bearing 53 carried by the bearing plate 54 at the top of the vertical screw chamber 50 and an outlet or discharge chute 55 is provided, this outlet or discharge 55 projecting downwardly at an angle and being arranged at such an elevation as to receive the dewatered ore or salt as indicated by reference character K in Fig. 4. An inlet for the material is indicated by reference character 56 and the arrangement of the inlet may be provided in accordance with requirements and as may be permitted by the room available for the installation. As in the first modification an angular or curved deflector extremity 57 is provided at the end of the horizontal screw for deflecting the partially dewatered compacted material into the vertical screw chamber where it will be available for the lift from the screw 51 and the dewatering operation from the vertical screw.

In both forms of the present invention the mixture, which in the present instance is a salt brine mixture, enters through the feed pipe into the settling chamber, the liquid passing under the baffle and overflowing by gravity into a launder or weir to be discharged through a suitable outlet pipe. The solids settle in the settling chamber in both instances, traveling down the inclined longitudinal side walls of the chamber into the screw chamber at the base of the settling chamber where the screw conveyor forces the solids into the outlet chamber communicating with the vertical screw elevator. The travel of the horizontal screw results in a feeding of the solids into the vertical screw inlet chamber where the vertical screw compacts the solids, eliminating any liquid pockets and raising the solids above the liquid level in the settling tank, from which point the dewatering is completed so that the final discharge into the chute at the upper end of the vertical screw conveyor chamber has been dewatered to a condition equivalent to free draining.

By means of the structures heretofore described a classifier is provided which utilizes a smaller floor space than is required by any known standard equipment, and the efficiency of the dewatering operation is at a maximum, with the operation uninterrupted by undesirable bridging of the solids. The efficiency of the apparatus is such that the salts do not remain in the screws long enough for leaching but run through rapidly and continuously and without hindrance from salt deposits which tend to slow down normal production of assemblies intended to accomplish the same general purposes.

It will be noted in the structures in question that the horizontal screw conveyors at the bottom of the settling tanks project beyond the tanks and into the vertical screw inlet chambers, the inlet chambers being those portions of the structures indicated by reference characters 21 and 49, and being generally of cylindrical form and approximating in diameter the diameter of the screw whereby the material adjacent the vertical screw is accumulated and partially compacted to produce a partial dewatering operation. This compacting of the material adjacent the inlet end of the vertical screw elevator accumulates a mass of material for convenient handling of the elevating screw and provides for the pick up or lift of the material by the vertical screw elevator in a manner to prevent interruption and provide continuous movement and operation. The drive means for the horizontal screw and the vertical screw are shown as independent, whereby the horizontal screw may be driven at such a speed as to maintain a suitable and necessary supply of material at the inlet end of the vertical screw elevator to permit this elevator to function and at the same time prevent a condition in the material which will hinder the operation of the assembly.

What I claim is:

1. In a dewatering classifier for separating solution liquor from undissolved residue ore, a settling chamber having downwardly converging side walls converging into an arcuate bottom, a baffle at the upper portion of said chamber defining an intake and an overflow weir, a horizontal screw conveyor arranged in the arcuate bottom of the settling chamber between said converging side walls, said horizontal screw projecting beyond said chamber, a housing snugly enclosing the projecting portion of the screw to restrict the discharge area of the screw for compacting the material in said projecting portion, said housing being formed with a side opening, a vertical screw elevator including a screw and a tubular casing, said screw elevator having a discharge chute at its upper end and being positioned with its major portion substantially above said settling chamber, said vertical screw elevator being offset from the axes of said horizontal screw, a deflector plate at the outer end of said housing spaced from the end of said horizontal screw conveyor, said deflector plate lying in a plane substantially tangent to the tubular casing of said vertical elevator for directing compacted material from the horizontal screw conveyor to the vertical screw elevator through said side opening, said vertical screw being of less diameter than the interior diameter of said vertical casing to permit return of liquid moved by said vertical screw to said settling chamber, and separate power means for driving the horizontal screw conveyor and the vertical screw elevator.

2. The structure of claim 1 characterized in that the horizontal screw conveyor and the vertical screw elevator are of approximately the same diameter and pitch, and both are at least in part confined by casing of equal diameter at their point of junction.

WILLIAM P. WILSON.

References Cited in the file of this patent

UNITED STATES PATENTS

| Number | Name | Date |
|---|---|---|
| 1,422,514 | Arbuckle | July 11, 1922 |
| 1,716,228 | Horne | June 4, 1929 |
| 1,762,593 | Schwarz | June 10, 1930 |
| 2,025,722 | Camp | Dec. 31, 1935 |
| 2,532,457 | Morgan et al. | Dec. 5, 1950 |

FOREIGN PATENTS

| Number | Country | Date |
|---|---|---|
| 405,314 | Great Britain | Feb. 2, 1934 |
| 440,428 | Germany | Oct. 25, 1925 |